United States Patent [19]

Dagata

[11] Patent Number: 4,725,161
[45] Date of Patent: Feb. 16, 1988

[54] ELECTRODE JOINT

[75] Inventor: Frank J. Dagata, Middleburg Heights, Ohio

[73] Assignee: Union Carbide Corporation, Danbury, Conn.

[21] Appl. No.: 904,067

[22] Filed: Sep. 5, 1986

[51] Int. Cl.4 .......................... B25G 3/34; F16B 11/00
[52] U.S. Cl. .................................... 403/267; 403/266; 403/DIG. 5; 373/92
[58] Field of Search ................ 403/DIG. 5, 265, 267, 403/268, 270, 271, 266; 373/92

[56] References Cited

U.S. PATENT DOCUMENTS

| 2,093,390 | 9/1937 | Wyckoff | 403/270 X |
|---|---|---|---|
| 2,510,230 | 6/1950 | Johnson et al. | 403/270 X |
| 2,735,705 | 2/1956 | Johnson et al. | 403/270 |
| 2,826,806 | 5/1958 | Stroup | 403/267 X |
| 2,828,162 | 3/1958 | Johnson et al. | 403/270 X |
| 2,862,748 | 12/1958 | Bailey et al. | 403/270 X |
| 2,894,776 | 7/1959 | Johnson | 403/270 X |
| 2,941,828 | 6/1960 | Hund et al. | 403/267 |
| 2,941,829 | 6/1960 | Morelli | 403/267 |
| 3,048,433 | 8/1962 | Doetsch | 403/267 |
| 3,048,434 | 8/1962 | Johnson et al. | 403/270 X |
| 3,140,967 | 7/1964 | Kaufmann et al. | 403/267 X |
| 3,540,764 | 11/1970 | Paus | 403/DIG. 5 X |
| 3,705,947 | 12/1972 | Persson | 403/DIG. 5 X |
| 3,858,994 | 1/1975 | Frazier | 403/DIG. 5 X |
| 4,007,324 | 2/1977 | Wallouch | 403/DIG. 5 X |
| 4,258,100 | 3/1981 | Fujitani et al. | 228/214 X |

Primary Examiner—Andrew V. Kundrat
Attorney, Agent, or Firm—James L. Sonntag

[57] ABSTRACT

An electrode joint for connecting two electrode sections together including a threaded nipple screwed into a threaded socket within the end of one electrode section is provided with a reservoir containing a cementitious bonding material comprising pitch particles and a foaming agent selected from the group consisting of sulfur, nitrated decant oil, 2,4-dinitroanoline and mixtures thereof.

17 Claims, 7 Drawing Figures

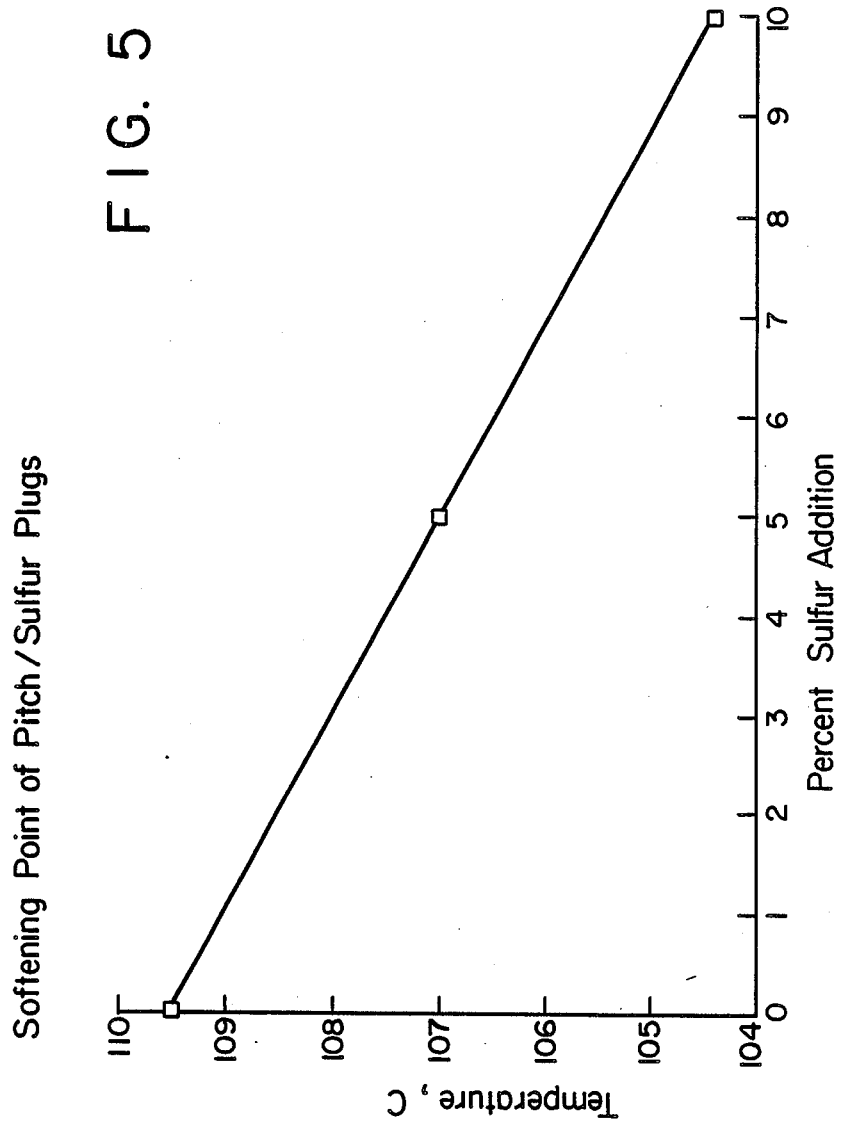

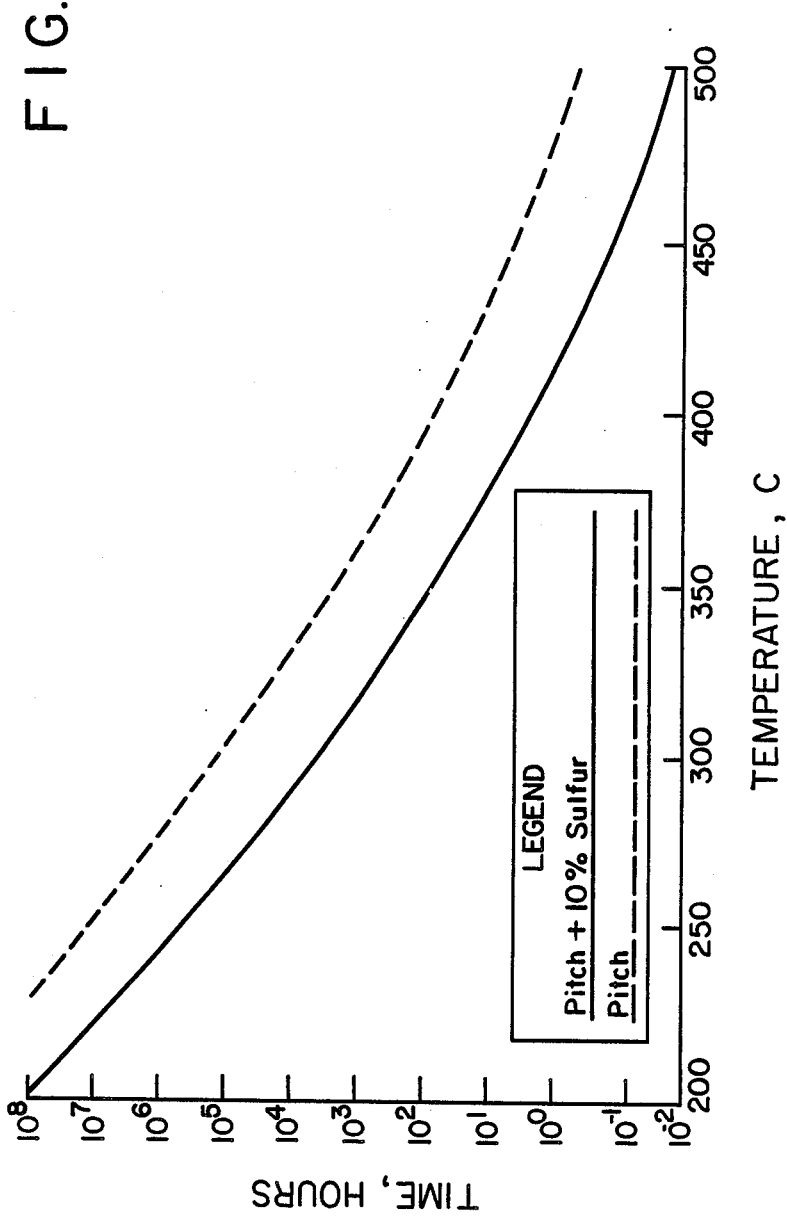

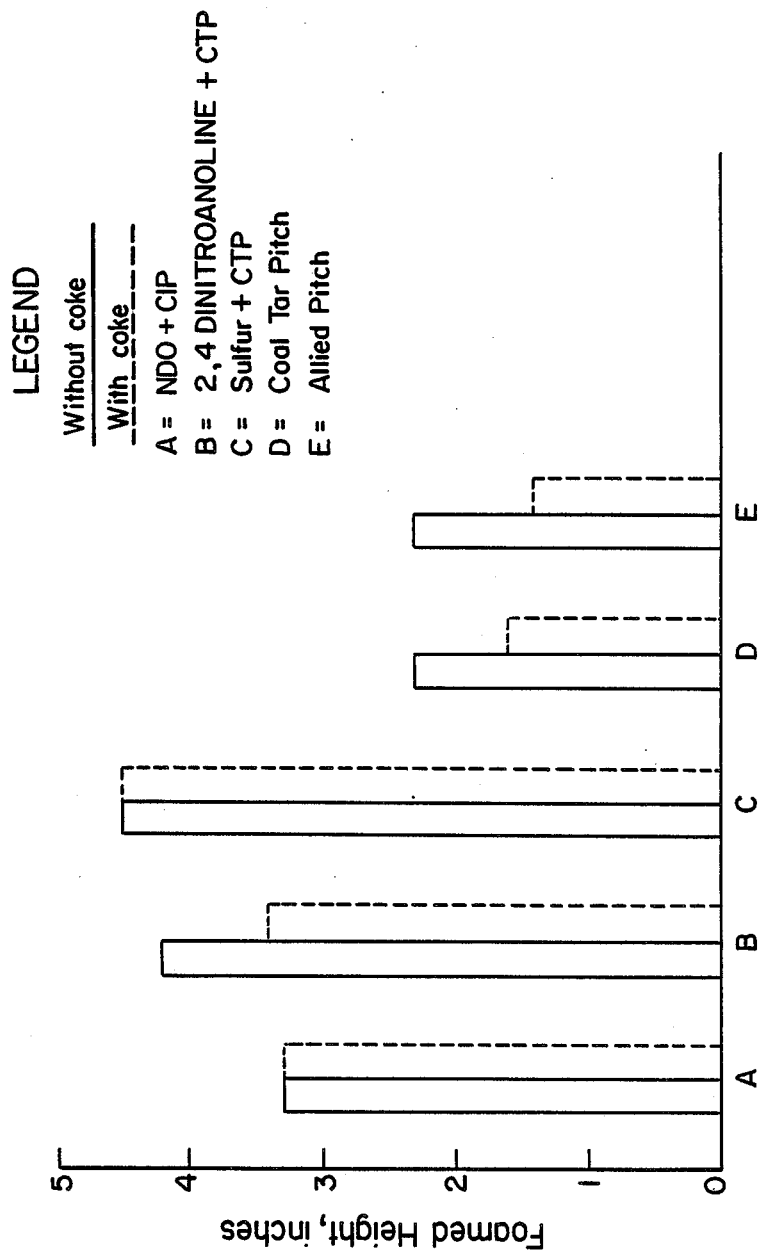

ELECTRODE JOINT

FIELD OF THE INVENTION

The present invention relates generally to electrode joints for connecting pairs of furnace electrode sections, and more particularly to an improved cementitious bonding material for use in such electrode joints.

BACKGROUND OF THE INVENTION

In the operation of electric steel melting furnaces, carbon or graphite electrodes are employed to conduct electric current to the metal through an electric arc which is struck between the end of the electrode and the metal to be melted. The heat that is developed by the electric arc not only melts the metal but also gradually consumes the electrode. It is therefore necessary to continuously feed the electrode into the furnace in order to maintain the electric arc. Eventually, as the electrode is consumed, a new electrode section is added by joining it to the end of the old electrode section.

A common method of joining the two electrode sections together is by use of a threaded nipple. The nipple is screwed into a correspondingly threaded socket provided in the end faces of the two electrode sections. Although this type of electrode joint has been used for many years now, it has not proven to be entirely satisfactory and is still the source of many problems. For example, there is a tendency for the electrode sections to occassionally unscrew and create loose joints when subjected to severe conditions of temperature, vibration and mechanical and thermal shock. The occurrence of loose electrode joints can be a major problem resulting in high electrical resistance and increased electrode consumption. In extreme cases, complete loss of an electrode section into the furnace may occur due to unscrewing and loosening of the electrode joint.

Attempts have been made to solve these problems by introducing an electrically conductive, carbonizable cement such as coal tar pitch between the nipple and both electrode sections in order to permanently bond the electrode joint. For example, in U.S. Pat. No. 2,828,162 to H. V. Johnson et al, a pitch filled reservoir is located within each end of the electrode nipple and channels or passageways are provided to distribute the liquid pitch upon heating to the threaded area around the nipple. The pitch fills the void spaces between the nipple and socket threads. Upon further heating, the pitch cokes or carbonizes, solidly cementing the joint and providing a permanent bond between the electrode sections. The bond is mechanically strong and of lower electrical resistance than an uncemented joint.

U.S. Pat. No. 2,836,294 to H. V. Johnson et al discloses a pitch cartridge adapted to be inserted inside a reservoir provided in the electrode nipple. The cartridge includes an outer fibrous, thermally insulating jacket which is consumable at a temperature well above the melting point of the pitch. The jacket defers the time at which the pitch melts and avoids a premature distribution of the liquid pitch before the electrode joint has been fully formed.

Despite these attempts to prevent loosening of the electrode joint, the problem still prevails and is most evident when the electrode is subjected to severe conditions. It has been found, for example, that high stresses that are created by thermal cycling of the electrode column can break the pitch coke bond between the nipple and socket threads, leaving only the abrasiveness of the coke residue on the threads to resist unscrewing and loosening of the joint. Moreover, the degree and frequency of vibration of some furnace operations can result in an unscrewing torque sufficient to overcome the resistance provided by the pitch coke, rendering the pitch filled reservoir joint ineffective. Also, before the liquid pitch cokes out on the nipple and socket threads, the frictional force between the threads is slightly reduced, which can initiate high column unscrewing and eventual loosening of the joint under certain operating conditions.

It has been proposed to improve the pitch coke bond between the electrode nipple and socket threads by employing a foaming agent along with the carbonizable pitch. The foaming agent upon heating forces the pitch out from the reservoir and into contact with the threads on both the nipple and electrode socket.

U.S. Pat. No. 4,007,324 to R. W. Wallouch discloses an electrode nipple having a reservoir containing a heat-foamable, thermoplastic material comprising particulate pitch and a lignin sulfonate-based binder. The high temperatures provided at the electrode joint foam the composition and cause it to expand into adjacent thread spaces at the joint.

However, the foaming agents so far employed with carbonizable cement in electrode joints have not proven to be altogether successful. First of all, the degree of swelling or expansion of the liquid pitch upon heating to the threaded area of the joint has actually been somewhat limited. Furthermore, the particular foaming agents employed have had little or no effect on the coking reaction and have not decreased the time required to implement the bond between the nipple and socket threads.

An important object of the present invention is therefore to improve the effectiveness of pitch filled reservoir electrode joints.

A more specific object of the present invention is to increase the resistance of such joints against unscrewing and loosening during use in an electric arc furnace.

Another object of the present invention is to decrease the time required to implement the joint unscrewing resistance and thereby lessen the chances of the joint becoming loosened due to the reduction of frictional forces on the threads by the presence of liquid pitch.

Still another object of the present invention is to minimize the concentration of mechanical stresses on the nipple and socket threads by a more uniform pitch distribution.

BRIEF DESCRIPTION OF THE INVENTION

The present invention broadly resides in an electrode joint for connecting two electrode sections together including a threaded nipple engaging a correspondingly threaded portion within the end of at least one electrode section, wherein a reservoir containing an electrically conductive, cementitious bonding material is disposed in communication with the threaded engagement between the nipple and electrode sections, the cementitious bonding material comprising a major portion of pitch and a minor portion of a foaming agent selected from the group consisting of sulfur, nitrated decant oil, 2,4-dinitroanoline and mixtures thereof.

In a preferred embodiment of the present invention, the cementitious bonding material comprises coal tar pitch particles and from about 2 to about 15 weight percent sulfur as the foaming agent.

The cementitious bonding material may also include from about 1 to about 20 weight percent coarse particles of coke, carbon or graphite to increase the unscrewing resistance of the pitch covered joint prior to coking.

BRIEF DESCRIPTION OF THE DRAWING

The present invention will now be described in greater detail with particular reference to the accompanying drawing, in which:

FIG. 5 is a graph showing the relationship between the softening point of the pitch and the percentage of sulfur addition to the pitch plug.

FIG. 6 is a graph showing the effects of sulfur addition to the pitch on the coke reaction time; and FIG. 7 is a bar chart comparing the foaming properties of the liquid pitch both with and without the foaming agent of the present invention.

DESCRIPTION OF THE PREFERRED EMBODIMENTS

Figure 1:
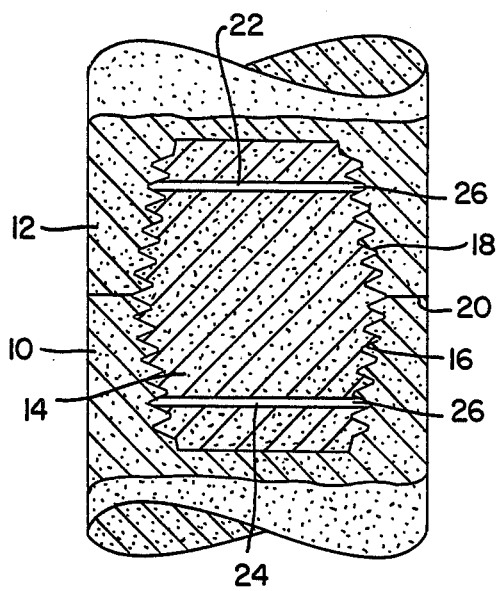
FIG. 1 is a longitudinal section through an electrode joint embodying the present invention.
Figure 2:
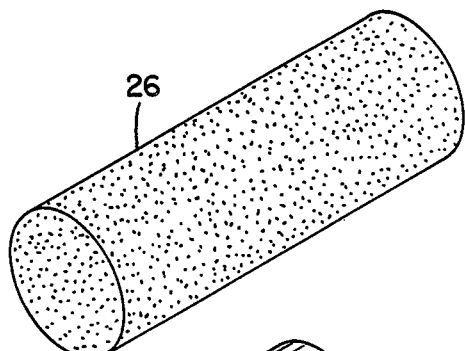
FIG. 2 is a perspective view of a molded pitch plug employed in the electrode joint shown in FIG. 1.

In FIG. 1, there is shown an electrode joint comprising a lower electrode section 10, an upper electrode section 12 and a threaded nipple 14, both of the electrode sections 10, 12 and the nipple 14 being composed of carbon or graphite. The nipple 14 is screwed into threaded engagement with threaded sockets 16, 18 provided within the end of each electrode section 10, 12, respectively, holding the end faces of the electrode sections in mechanical and electrical contact as shown at 20. A diametrical recess 22 is bored into the upper portion of the nipple 14 and a similar recess 24 is bored adjacent to the lower end of the nipple. Each recess 22, 24 communicates with a portion of the threaded engagement between the nipple 14 and the threaded sockets 16, 18 provided within the end of each electrode section. Within each recess or reservoir 22, 24 is a preformed plug 26 of a cementitious bonding material. The plug 26 is shown in enlarged detail in the view of FIG. 2. The cementitious bonding material comprises a major proportion of finely divided particles of pitch and a minor proportion of a foaming agent. The pitch has a softening temperature of between about 75° and 200° C. During use in an electric arc furnace, the electrode joint is heated and the pitch melts and flows out of the two reservoirs 22, 24. The liquid pitch enters the portions of the threaded engagement between the nipple and electrode sockets located at each end of the reservoirs and fills the clearance spaces or voids that exist between the threads. Upon further heating, the pitch carbonizes and bonds the nipple to the two electrode sections and prevents them from unscrewing and loosening during use of the joined electrode column.

The foaming agent used in the practice of the present invention is a material selected from the group consisting of sulfur, nitrated decant oil, 2,4-dinitroanoline and mixtures thereof. Sulfur is the preferred foaming agent of the invention. The foaming agent is preferably employed in amounts ranging from about 2 to about 15 percent by weight of the total cementitious bonding composition.

Although most any low melting pitch can be used as the major component of the bonding compositions, it is preferred to employ a coal tar pitch having a softening point of between about 90° C. and 120° C. The particle size of the pitch is not too critical and may range from about 10 to 200 mesh, for example.

It is also possible, but not necessary, to employ coarse particles of coke, carbon or graphite along with the pitch and foaming agent in the cementitious bonding material. The use of the coarse particles increases the unscrewing resistance of the pitch covered joint prior to coking of the liquid pitch during use. The coke, carbon or graphite particles may be employed in amounts ranging from about 1 to about 20 percent by weight of the total composition. An excessive amount of particles may inhibit pitch foaming and is therefore not desirable.

The pitch particles, foaming agent and optionally, the coarse coke, carbon or graphite particles are thoroughly mixed together in a roller blender, for example. The powder mixture is then molded at room temperature under high pressure, e.g. about 2000 psi, to form plugs of an appropriate diameter and length to easily fit into each reservoir. Cold molding is required in order to prevent the low temperature reaction (approximately 150° C.) between the sulfur and the pitch.

Figure 3:
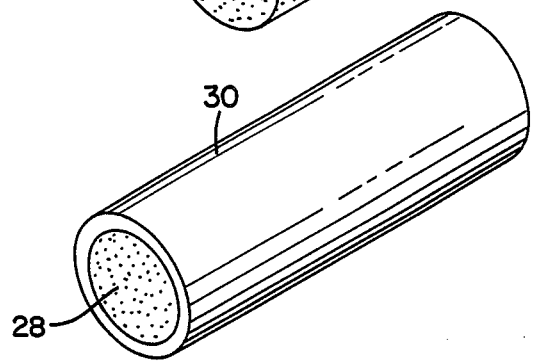
FIG. 3 is a perspective view of a pitch filled tube or cartridge which may also be used in the joint of FIG. 1.

Instead of molding the cementitious bonding material into plugs, the powders 28 may be packed tightly into an outer jacket or tube 30 as shown in FIG. 3. The jacket or tube 3 may be made of any readily consumable material such as paper or cardboard, for example.

Plugs may also be prepared by heating the pitch-foaming agent mixture to a plastic state, thoroughly mixing the components and then forming the plastic mixture into the desired size plug. A jacket or tube, as described above, may be used to contain the mixture.

Many techniques may be employed to secure the molded plugs, rods or filled tubes in place inside the pitch reservoir. For example, after placing the plugs or tubes inside the reservoir, they may be adequately secured by use of metal expansion rings, styrofoam end plugs, contact cement, wood glue, or by simply tapering the plugs or rods and then force fitting them inside the drilled or bored reservoir. The securing technique actually used should not hender the foaming of the pitch at temperatures of about 150° C.

Figure 4:
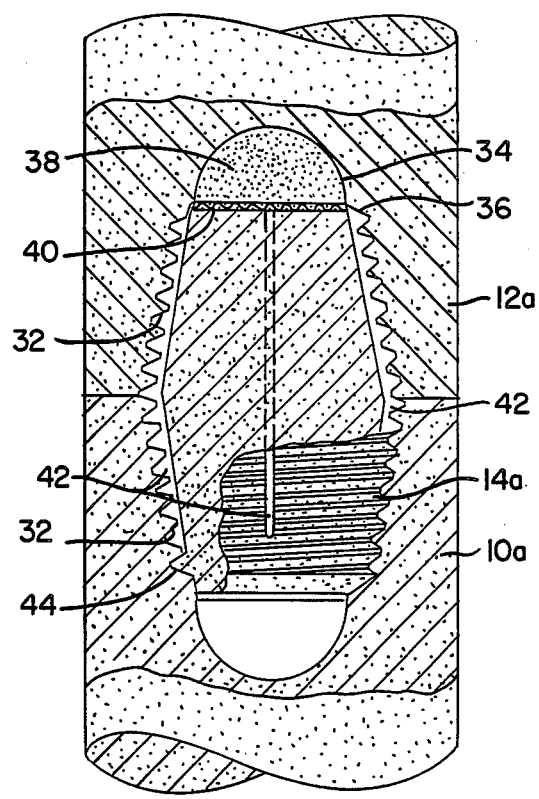
FIG. 4 is a longitudinal section through another electrode joint embodying the present invention.

Another electrode joint that can be used in the practice of the present invention is shown in FIG. 4. Here, the upper electrode section 12a is provided with a threaded socket 32 to receive the upper end of the threaded nipple 14a and this threaded socket 32 is deepened to form a cavity 34 located at the base of the socket. This cavity 34 is hemispherical in shape and is about the same diameter as the innermost thread 36. The cavity 34 is filled with the cementitious bonding material 38 and is held in place, for example, by wire screen 40. The nipple 14a is formed with vertically extending channels 42. Preferably, there are four channels spaced equally around the nipple and the channels are cut to a depth sufficient to extend below the roots of the nipple threads. The channels 42 extend downwardly for the greater part of the height of the nipple and terminate short of the lowermost thread 44. As the electrode joint is heated during use, the pitch in the cavity 34 melts and flows down the channels 42 and is distributed around the threaded engagement between the nipple 14a and each electrode section 10a, 12a. It will be noted that in this electrode joint the cementitious bonding material is held in a reservoir located within the joint but outside of the nipple itself. The electrode joint shown in FIG. 4 is disclosed and claimed in U.S. Pat. No. 2,510,230 to H. V. Johnson et al.

The cementitious bonding composition of the present invention offers a number of outstanding advantages. First of all, the foaming agent, preferably sulfur, upon heating will melt and react with the pitch at a fairly low temperature, e.g. about 150° C., producing a foaming action which expands the melted pitch and forces it out from the reservoir and into the threaded engagement between the nipple and electrode sockets. Furthermore, the foaming agent upon heating vaporizes and causes gas pressure to build up inside the reservoir. This gas pressure buildup in turn forces the melted pitch even deeper into the threaded engagement so as to fill more void spaces between the threads and to contact a greater number of the threads than was heretofore possible using pitch without the foaming agent.

Another benefit derived from the use of sulfur as the foaming agent is that the addition of sulfur substantially reduces the softening point of the pitch and this further aids penetration of the liquid pitch into the threaded area of the joint. Moreover, the addition of sulfur also accelerates the rate of coke formation upon heating thereby shortening the time necessary to produce a well bonded joint. This time factor is extremely important since vibration and other forces that tend to loosen the electrode joint are present up until the time when the pitch has been completely coked.

The following examples will serve to further illustrate the practice of the present invention.

EXAMPLE I

Dry, precipitated sulfur powder was added to Allied 32 Hard coal tar pitch particles in a weight proportion to provide an approximately 10 wt.% sulfur-90 wt.% pitch mixture. The coal tar pitch particles had a softening point of 108° C. and were screened prior to mixing through 20 mesh particle size. The mixture was throughly blended in a roll mill for about 10 minutes and then placed in an aluminum mold with steel inserts and rams capable of pressing ¾ inch by one inch long plugs during each molding step. The plugs were pressed at room temperature under a pressure of about 2000 psi. Two 49/64 inch diameter holes were drilled through a number of threaded carbon nipples perpendicular to the longitudinal axes of each nipple. The two holes were drilled at a location about 2¾ inch from each end of the nipple. The molded plugs were then inserted into the drilled holes in some of the nipples until the holes were nearly full except for the last two end plugs for each hole. A contact cement, e.g. DUCO cement, was placed within the ends of each drilled hole. The end plugs were then inserted and tapped tightly into place with a ½ inch diameter wooden rod. Additional cement was then placed against each end plug for added bonding and allowed to dry for at least 5 minutes. Basically the same procedure was followed to fill the drilled holes in the remaining nipples except that the plugs in this case were molded from the same pitch particles but without the addition of sulfur powder. A number of electrode joints were then assembled using nipples containing both the pitch-sulfur mixture and pitch alone in the drilled holes. The electrode joints were placed in an electric furnace and heated to 800° C. for a period of about 4 hours. Thereafter, the joints were allowed to stand and cool and were then removed from the furnace, cut into sections and examined. It was found that significantly more threads were completely coated with pitch in the case of electrode joints using the pitch-sulfur mixture. Moreover, the shear forces required to separate the nipple and electrode sockets were much greater than in the case of the electrode joints using pitch alone. Table I below summarizes the results of this electrode joint test.

TABLE I

| | Coated Threads | | Pitch Left | Shear |
| | Completely (%) | Partially (%) | In Drilled Holes (%) | Force (Pounds) |
| --- | --- | --- | --- | --- |
| Joint With Pitch Only | 23 | 5 | 5 | 163 |
| Joint With Pitch-Sulfur Mixture (10% Sulfur) | 92 | 0 | 5 | 397 |

It will be seen from the above table that four times as many threads are coated with pitch when the pitch-sulfur mixture is used as compared to the number of threads coated using pitch alone. Furthermore, it will be observed that the bond strength between the nipple and socket threads is increased two to three times by the use of the pitch-sulfur mixture. This is due to the increased area covered by the foamed pitch when the joint is heated.

EXAMPLE II

A number of plugs were made in the same manner as described in the previous Example I, except that the composition of the plugs was varied from all pitch particles with no sulfur addition to a plug containing 90 wt.% pitch particles and 10 wt.% sulfur powders. The plugs were placed in an oven and gradually heated until the first sign of plug softening could be detected. The softening temperature of the plugs was noted and the plugs were then removed from the oven. The graph of FIG. 5 shows the relationship between the softening point and the percent sulfur addition to the plug composition. It will be seen from this graph that the softening temperature of the pitch-sulfur plug decreases proportionately with an increase in the sulfur addition. Moreover, it will be noted that a substantial depression of the softening point of four to five degrees Centigrade can be expected over a 2 to 10 weight percent range of sulfur addition.

EXAMPLE III

A number of plugs were made in the same manner as described in the previous Example I, some of the plugs containing only pitch particles with no sulfur addition and the balance of the plugs containing 90 wt.% pitch particles and 10 wt.% sulfur powders. The plugs in each group were placed in separate ovens and coked at temperatures ranging up to 500° C. The time required in hours to coke the plugs at selected temperature levels was recorded throughout the experiment. The two curves in FIG. 6 show the relationship between the coking time and temperature of the plugs, the broken line representing those plugs made with only the pitch particles and the solid line representing those plugs made with both pitch particles and sulfur. It will be apparent from an examination of the two curves that the addition of sulfur to the pitch plugs substantially reduces the time of coke formation. Actually, the rate of coke formation is twenty-five times faster with the addition of sulfur than without, providing rapid resistance to joint unscrewing. Changes of premature joint unscrewing prior to coking of the pitch is substantially reduced by the pitch foaming additive.

EXAMPLE IV

A number of pitch compositions were prepared both with and without a foaming agent according to the present invention. The foaming agents employed were either sulfur, nitrated decant oil (NDO) or 2,4-dinitroanoline the particular amount of the foaming agent used being the same in all cases, i.e. 5 wt.%. Pitch compositions were also prepared in each group containing about 25 wt.% coke particles having a particle size 55% minus 200 mesh. A number of holes were drilled into a graphite block, the diameter and depth of each hole being identical, i.e. ½ inch diameter and 4½ inches deep. The same weight of each pitch composition (i.e. 1 gram) was placed into each hole and lightly tamped into the bottom of the hole. The graphite block was then placed in an oven and heated gradually to elevated temperatures above about 800° C. The block was removed and the holes examined to determine the height to which each pitch composition foamed during the test. The bar chart in FIG. 7 shows the results of this test. It will be seen from this chart that the pitch composition containing the sulfur addition foamed to the greatest height and actually overflowed the top of the hole. In all cases, the pitch compositions containing a foaming agent exhibited a greater foaming action than the pitch compositions containing only a coal tar pitch. It will be further noted that in most all cases except where sulfur or decant oil was used as the foaming agent, the addition of the coarse coke particles at least slightly depressed the foaming action when compared to those sample compositions containing no coke particles at all.

What is claimed is:

1. An electrode joint for connecting two electrode sections together comprising a threaded nipple engaging a correspondingly threaded portion provided within an end of at least one electrode section and a reservoir containing a cementitious bonding material communicating with the threaded engagement between the nipple and electrode sections, the cementitious bonding material comprising a major portion of pitch and a minor portion of a foaming agent selected from the group consisting of sulfur, nitrated decant oil, 2,4-dinitroanoline and mixtures thereof, wherein the foaming agent is reactive with the pitch.

2. An electrode joint according to claim 1 wherein said cementitious bonding material contains from about 2 to about 15 percent by weight of said foaming agent.

3. An electrode joint according to claim 2 wherein said foaming agent is sulfur.

4. An electrode joint according to claim 1 wherein said cementitious bonding material contains coal tar pitch particles having a softening point of from about 75° to about 200° C.

5. An electrode joint according to claim 1 wherein said cementitious bonding material contains from about 1 to about 20 percent by weight of relatively coarse particles of coke, carbon or graphite.

6. An electrode joint according to claim 1 wherein said cementitious bonding material is molded into a plug.

7. An electrode joint according to claim 1 wherein said cementitious bonding material is contained inside a tube.

8. An electrode joint according to claim 1 wherein said reservoir is substantially radially located inside said nipple and communicates directly with the threaded portion on said nipple.

9. An electrode joint according to claim 1 wherein said reservoir is located inside the threaded portion of the electrode section.

10. An electrode nipple for connecting two electrode sections together, said nipple having formed therein a reservoir communicating with a threaded portion on its surface and a cementititous bonding material deposited in said reservoir for displacement to said threaded portion during use of said nipple, said cementitious bonding material comprising a major portion of pitch and a minor portion of a foaming agent reactive with the pitch and selected from the group consisting of sulfur, nitrated decant oil 2,4-dinitroanoline and mixtures thereof.

11. An electrode nipple according to claim 10 wherein said cementitious bonding composition contains from about 2 to about 15 percent by weight of said foaming agent.

12. An electrode nipple according to claim 11 wherein said foaming agent is sulfur.

13. An electrode nipple according to claim 10 wherein said cementitious bonding material contains coal tar pitch particles having a softening point of from about 75° to about 200° C.

14. An electrode nipple according to claim 10 wherein said cementitious bonding material contains from about 1 to about 20 percent by weight of relatively coarse particles of coke, carbon or graphite.

15. An electrode nipple according to claim 10 wherein said cementitious bonding material is molded into a plug.

16. An electrode nipple according to claim 10 wherein said cementitious bonding material is contained inside a tube.

17. A pitch reservoir plug molded from a mixture comprising coal tar pitch and from about 2 to about 15 percent by weight of a foaming agent reactive with the pitch and selected from the group consisting of sulfur, nitrated decant oil, 2,4-dinitroanoline and mixtures thereof.

* * * * *